United States Patent [19]

Terunuma

[11] 4,324,470
[45] Apr. 13, 1982

[54] LIGHT INTERCEPTING DEVICE OF A CAMERA

[75] Inventor: Hiroshi Terunuma, Ichikawa, Japan
[73] Assignee: Nippon Kogaku K.K., Tokyo, Japan
[21] Appl. No.: 226,511
[22] Filed: Jan. 19, 1981
[30] Foreign Application Priority Data
  Jan. 11, 1980 [JP] Japan ............................ 55-11046[U]
[51] Int. Cl.³ ........................ G03B 19/04; G03B 1/04; G03B 17/02
[52] U.S. Cl. .................................. 354/214; 242/71.6; 354/288
[58] Field of Search ................. 242/71, 71.6; 354/288, 354/173, 214

[56] References Cited
U.S. PATENT DOCUMENTS
3,474,714 10/1969 Bihlmaier et al. ................... 354/214
3,589,639 6/1971 Engelsmann et al. ............. 242/71.6
3,679,148 7/1972 Daitoku et al. ..................... 242/71.6

Primary Examiner—Donald A. Griffin
Attorney, Agent, or Firm—Fitzpatrick, Cella, Harper & Scinto

[57] ABSTRACT

In a camera which has a through-hole formed in a portion of a wall forming a chamber for containing therein a magazine of roll film wound around a spool shaft which faces the end surface of the spool shaft and to which is mountable an electric film rewind device having a drive shaft inserted into the chamber through the through-hole and coupled to the spool shaft and wherein a light-intercepting ring having a contact surface bearing against the end surface of the spool shaft and biased axially of the spool shaft toward the interior of the chamber is slidably fitted in the through-hole, the light-intercepting ring has on said contact surface an annular ridge projected axially of the spool shaft. The ridge is provided at a location which is adjacent to and along the end surface during the contact thereof with the end surface.

4 Claims, 4 Drawing Figures

LIGHT INTERCEPTING DEVICE OF A CAMERA

BACKGROUND OF THE INVENTION

1. Field of the Invention

This invention relates to a light-intercepting device of a camera using a roll film magazine, and more particularly to a light-intercepting device for preventing leakage of light from a through-hole formed to extraneously drive the spool shaft of the magazine.

2. Description of the Prior Art

In a camera using a roll film magazine, after a scheduled exposure of film has all been terminated, the spool shaft of the magazine is rotated by means of a film rewinding handle coupled to the spool shaft to thereby rewind the film again into the magazine. An electric film rewind device is known which is mounted to the bottom of the camera to effect said rewind operation with the aid of the drive force of an electric motor. To connect the drive shaft of this device and the spool shaft of the film magazine, there is known a camera formed with a through hole through which the drive shaft may be inserted into the bottom of the magazine containing chamber of the camera. In such camera, a light-intercepting device is known which is provided between the spool shaft and the magazine containing chamber to prevent light from leaking into the interior of the camera through the through-hole.

The device of such type is of a ring-like shape and is somewhat vertically slidable in the through-hole. A spring is disposed between said device and the bottom of the camera to bias the ring-like upper surface of the device in a direction to bear against the end portion of the spool shaft. Therefore, the light-intercepting device is always in contact with the end portion of the spool shaft and thus, even in a condition in which a motor drive device is not mounted on the camera, extraneous light which tends to leak into the camera from the through-hole, the hollow portion of the light-intercepting device and the portion between said device and the end portion of the spool shaft is prevented. However, the spool shaft of the film magazine is not always manufactured to the length as specified and when a film magazine not having a sufficient length for the light-intercepting device to make contact with the spool shaft has been loaded or when the spring has become deteriorated, the biasing force of the spring has not worked so much and this has sometimes caused the contact between the spool shaft and the light-intercepting device to be imperfect and created a gap therebetween through which light leaks.

Further, in the conventional camera provided with the above-described light-intercepting device, there has been a fear that the center of the spool shaft is displaced by a force applied to the spool shaft during the film advance accompanying a photographing operation and as a result, distortion is caused in the film surface drawn out to the exposure position.

SUMMARY OF THE INVENTION

It is an object of the present invention to overcome the above-noted disadvantages and to provide a light-intercepting device of a camera which completely prevents leakage of light and also imparts stable rotation to the spool shaft.

The invention will become fully apparent from the following detailed description thereof taken in conjunction with the accompanying drawings.

DESCRIPTION OF THE PREFERRED EMBODIMENTS

Figure 1:
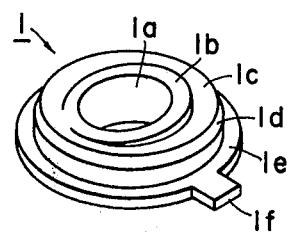
FIG. 1 is a perspective view showing the appearance of the light-intercepting member according to a first embodiment of the present invention.
Figure 2:
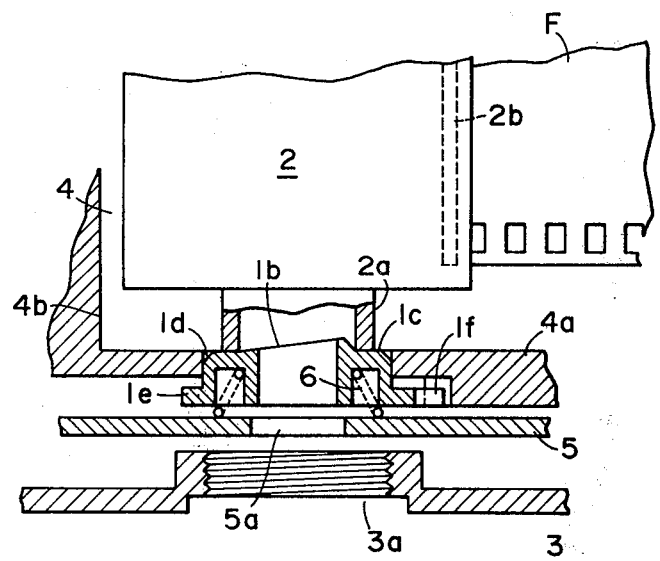
FIG. 2 is a cross-sectional view of a light-intercepting device including the light-intercepting member of FIG. 1 which is provided in a camera.

The invention will hereinafter be described with reference to the drawings which show embodiments of the invention. Referring to FIGS. 1 and 2 which show a first embodiment of the present invention, a light-intercepting member 1 is formed of an opaque substance such as plastics or metal into the shape of a ring having a through hollow portion 1a for passing therethrough the drive shaft of an electric film rewind device. One end of a spool shaft 2a having a roll film F wound thereon is projected from a film magazine 2 loaded into a magazine containing chamber 4. Through-holes are formed in the portions of walls 4a and 4b forming the containing chamber 4 which are opposed to the end of the spool shaft 2a, and these through-holes reach the outside through through-holes 5a and 3a formed in a fixed portion 5 and the bottom wall 3 of a camera, respectively. The light-intercepting member 1 is vertically movably fitted in the through-hole of the wall 4a, and the amount of upward movement thereof is limited by an edge 1e around the light-intercepting member 1 and the amount of downward movement thereof is limited by the fixed portion 5. A spring 6 upwardly biasing the light-intercepting member 1 is provided between the member 1 and the fixed portion 5. Accordingly, in a condition in which the film magazine 2 is not loaded, the light-intercepting member is in a position in which the surface 1c thereof making contact with the end surface of the spool shaft faces the interior of the magazine containing chamber 4. On the contact surface 1c, there is formed annular ridge 1b along the inner peripheral surface of the spool shaft 2c. The ridge 1b is sloped so that it becomes lower as it becomes more distant from the portion which is nearest the film outlet port 2b of the film magazine. The ridge 1b serves to stabilize the rotational position as the bearing of the spool shaft.

A light-intercepting lid, not shown, is normally screwed in the through-hole 3a, but it is removed when the electric film rewind device is mounted to the bottom of the camera. At this time, any extraneous light which tends to leak into the containing chamber from between the contact surface 1c and the spool shaft 2a through the through-holes 3a, 5a and the hollow portion 1b may be prevented from leaking due to the presence of the ridge 1b sloped as shown in FIG. 2 which provides a barrier against the extraneous light which enters a slight gap formed between the contact surface 1c and the spool shaft 2a. The slope of the ridge 1b is useful to render smooth the action of the end surface of the spool shaft 2a downwardly depressing the light-intercepting member 1 which accompanies the operation of loading the film magazine 2 into the containing chamber. As regards the leakage of light from the leftward low portion of the ridge 1b as viewed in FIG. 2, that portion is opposite to the film outlet port 2b of the film magazine and therefore, before reaching the film, the light is attenuated and does not sensitize the film. The projection 1f of the light-intercepting member 1 engages the cutaway portion of the bottom 4a, thereby restraining the member 1 from being rotatively displaced.

It is preferable to provide a chamber 1d in the periphery of the contact surface 1c of the light-intercepting member in order to render the loading smooth by the end portion of the spool shaft 2a downwardly depressing the entire light-intercepting member 1 against the biasing force of the spring 6 when the film magazine is loaded into the containing chamber.

Figure 3:
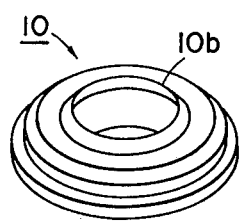
FIG. 3 is a perspective view showing the appearance of the light-intercepting member according to a second embodiment of the present invention.

Of course, to assure perfect light-interception, it is desirable that a ridge 10b be provided along the entire inner periphery of the spool shaft as in the light-intercepting member 10 of a second embodiment shown in FIG. 3. In this case, the ridge 10b has no directionality and therefore, it is not necessary to restrain rotative displacement.

Figure 4:
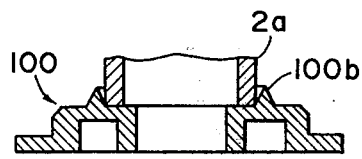
FIG. 4 is a cross-sectional view of the light-intercepting member according to a third embodiment of the present invention.

As in a third embodiment shown in FIG. 4, the light-intercepting member 100 may be formed with an annular ridge 100b which extends along the outer periphery of the spool shaft 2a.

I claim:

1. In a camera which has a through-hole formed in a portion of a wall forming a chamber for containing therein a magazine of roll film wound around a spool shaft which faces the end surface of said spool shaft and to which is mountable an electric film rewind device having a drive shaft inserted into said chamber through said through-hole and coupled to said spool shaft and wherein a light-intercepting ring having a contact surface bearing against the end surface of said spool shaft and biased axially of said spool shaft toward the interior of said chamber is slidably fitted in said through-hole, the improvement residing in that said light-intercepting ring (1, 10, 100) has on said contact surface an annular ridge (1b, 10b, 100b) projected axially of said spool shaft, said ridge being provided at a location which is adjacent to and along said end surface during the contact thereof with said end surface.

2. A camera according to claim 1, wherein said ridge has an outer side surface sloped inwardly of the annulus with respect to the axial direction of said spool shaft.

3. A camera according to claim 1, wherein said spool shaft is formed into the form of a hollow cylinder at at least the end portion thereof including said end surface, and said ridge is provided at a location corresponding to the inside of said spool shaft.

4. A camera according to claim 1, wherein said magazine has an outer shell including an outlet port for the roll film, said ridge is sloped so that as it becomes more distant from the portion nearest said outlet port when said magazine has been contained, it becomes lower with respect to said contact surface, and said light-intercepting ring includes means (1f) for restraining rotation with respect to said through-hole.

* * * * *

UNITED STATES PATENT AND TRADEMARK OFFICE
CERTIFICATE OF CORRECTION

PATENT NO. : 4,324,470
DATED : April 13, 1982
INVENTOR(S) : HIROSHI TERUNUMA

It is certified that error appears in the above—identified patent and that said Letters Patent is hereby corrected as shown below:

In the headnote, item [30], "Jan. 11" should be --Jan. 31--.

Signed and Sealed this

Twenty-second Day of June 1982

[SEAL]

Attest:

GERALD J. MOSSINGHOFF

Attesting Officer     Commissioner of Patents and Trademarks